United States Patent [19]

Hall

[11] Patent Number: 5,262,926
[45] Date of Patent: Nov. 16, 1993

[54] RUGGED HAND-CARRIABLE PORTABLE COMPUTER WITH DISPLAY REFLECTOR

[76] Inventor: Gerard J. Hall, c/o School Book Computer Systems, Inc. P.O. Box 14093, Research Triangle Park, N.C. 27709

[21] Appl. No.: 660,496

[22] Filed: Feb. 25, 1991

[51] Int. Cl.⁵ .......................... H05K 5/03; G06F 1/16
[52] U.S. Cl. ................................... 361/681; 361/680; 361/684
[58] Field of Search ........... 358/254; 340/700; 364/708; 361/380, 390–395, 399

[56] References Cited

U.S. PATENT DOCUMENTS

| | | | |
|---|---|---|---|
| 3,299,254 | 1/1967 | Dobbins et al. | 235/61.7 |
| 3,784,979 | 1/1974 | Friedman et al. | 340/146.2 |
| 4,157,757 | 6/1979 | Gallaher, Jr. | 206/328 |
| 4,259,668 | 3/1981 | Nishimura et al. | 340/711 |
| 4,581,716 | 4/1986 | Kamiya | 364/900 |
| 4,589,659 | 5/1986 | Yokoi et al. | 273/1 GC |
| 4,652,932 | 3/1987 | Miyajima et al. | 358/236 |
| 4,705,479 | 11/1987 | Maron | 434/335 |
| 4,719,513 | 1/1988 | Peterson | 358/254 |
| 4,809,078 | 2/1989 | Yabe et al. | 358/236 |
| 4,839,837 | 6/1989 | Chang | 364/708 |
| 4,852,498 | 8/1989 | Judd | 108/43 |
| 4,922,060 | 5/1990 | McJunkin | 340/700 X |

FOREIGN PATENT DOCUMENTS 1233123  6/1960  France .............................. 358/254

*Primary Examiner*—Leo P. Picard
*Assistant Examiner*—Michael W. Phillips
*Attorney, Agent, or Firm*—Panitch Schwarze Jacobs & Nadel

[57] ABSTRACT

A rugged portable computer and an educational system employing the rugged portable computer that includes a housing with a base portion having first and second surfaces and a cover portion having inner and outer surfaces. Contained on the first surface is a display panel for displaying information or data from the computer to the user. An input device is located on the second surface of the base portion. The inner surface of the cover contains a reflecting device for reflecting the data or information displayed by the display panel so a user can view the information or data when the cover portion is in an appropriate position. The portable computer includes circuitry which enables the display panel to display a mirror image of the information to be displayed so that when the information is reflected it is in a form which is readable by the user.

17 Claims, 4 Drawing Sheets

FIG. 3
PRIOR ART

RUGGED HAND-CARRIABLE PORTABLE COMPUTER WITH DISPLAY REFLECTOR

BACKGROUND OF THE INVENTION

The present invention relates generally to portable computers and, more particularly, to a rugged, portable computer in which a display panel is mounted along with the remainder of the computer hardware in a base housing, and the information or data provided by the display panel is reflected onto a movable reflecting means for viewing by a user. The present invention also relates to an educational system which employs such a rugged portable computer.

Previous and present portable or lap-top computers have usually consisted of two main components. The electronics, including the processor, memory, etc. is contained within a base component or housing along with a keyboard or other input/ output and/or storage means. The display panel, typically a liquid crystal display panel, has been contained within a separate cover component which is movably attached to the base or housing. When the computer is in use, the cover is moved to an open position with the display panel exposed at a convenient angle, and the user directly views the display panel which is generally located on the inner surface of the cover. When the computer is not in use, the cover is in a closed or travel position covering the keyboard and display panel for protection against damage during travel.

In the past, portable computers of this type have primarily been used by adults, either for business or personal use. This is attributable to several factors, including cost and accessibility. However, as the use of computers has become more of a societal norm, it has become increasingly important for individuals to familiarize themselves with computers at an early age. Schools, for example, frequently have computers on their premises for student use, typically within a centralized computer room or facility. These computers are not readily accessible by students at all times and usually are not portable and, therefore, the student may not be able to develop a high level of computer literacy as the computer must remain in school at the end of the day.

Although portable computers are not a new concept, the purchases of portable computers have been primarily by individuals or groups with substantial resources. Partially, this is because portable computers have been expensive and many individuals often cannot afford to purchase a portable computer for private use. This is still true even though, in recent years, the cost of portable computers has decreased substantially so that many individuals have been able to purchase their own portable computers. Though portable computers are now more affordable, too many parents may still be reluctant to buy such an item for their children, particularly younger children. Portable computers are still not an inexpensive item and, additionally, most such portable computers are still susceptible to breakage if the user is not careful.

The hinges that connect the cover component to the base or housing are particularly vulnerable to breakage. If the hinges break on such a portable computer the cover component with the display panel may become separated from the rest of the computer, possibly severing electrical communication with the display panel so that the display panel becomes inoperable and the unit loses its usefulness. Cover components on portable computers are often slight of build, resulting in a minimal degree of protection for the display panel located within it. Generally a display panel is, besides being delicate and fragile, the most expensive component of a portable computer.

A need has developed for a more durable, rugged portable computer. Such a computer is particularly desirable for widespread student use, especially among younger students. With such a rugged portable computer a student can use the computer at school, transport it home or to some other location, and perform additional tasks on it virtually at any time or place. Using internal battery power, such a computer is capable of functioning in any location independent of the availability of external electrical power.

The present invention comprises a rugged portable computer in which the display panel is fully contained and protected within the base or housing of the computer, and an educational system employing such a rugged portable computer. The present invention employs a rugged removable storage device and a rugged disk drive. This removable storage technology is capable of operating in rugged environments.

SUMMARY OF THE INVENTION

Briefly stated, the present invention comprises a rugged portable computer and a related educational system. The computer is encased within a housing having a base with first and second surfaces and a cover with inner and outer surfaces. The computer includes a display means protected within the housing and located on the first housing surface for displaying information to a user and an input means located on the second housing surface for inputting information or data from the user to the computer. The display means includes means for enabling the display means to display a mirror image of the information or data to be displayed. The information or data displayed by the display means is viewed by the user with a movable reflecting means which receives the mirror image information or data displayed by the display means and reflects it to permit the user to view the displayed information or data with a normal orientation.

BRIEF DESCRIPTION OF THE DRAWINGS

The foregoing summary, as well as the following detailed description of the presently preferred embodiment of the invention, will be better understood when read in conjunction with the appended drawings. For the purpose of illustrating the invention, there is shown in the drawings an embodiment which is presently preferred. It should be understood, however, that the present invention is not limited to the particular arrangement and instrumentality shown. In the drawings:

FIG. 3 is a schematic block diagram of a portion of the display circuitry employed in the prior art;

DESCRIPTION OF PREFERRED EMBODIMENT

Figure 1:
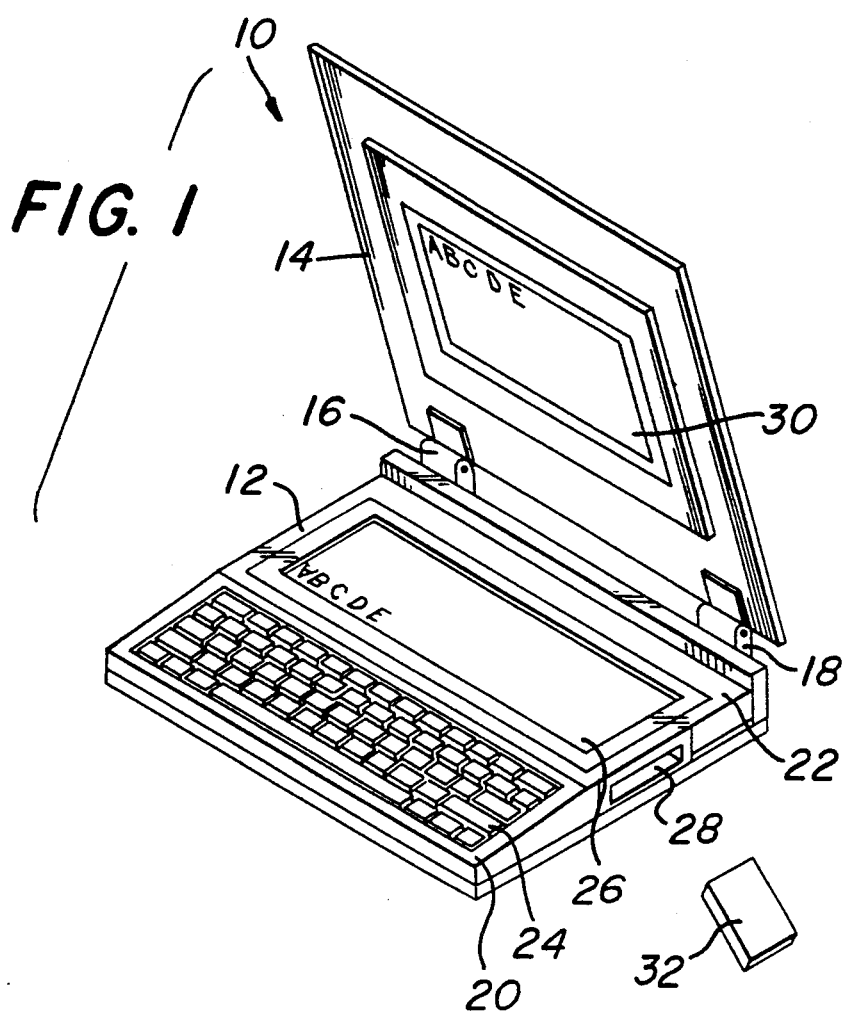
FIG. 1 is an illustration of a rugged portable computer in accordance with the present invention.

The presently preferred embodiment of the invention described below relates to a rugged portable computer and a related educational system which employs the rugged portable computer.

In general, in the disclosed embodiment, the portable computer comprises a durable, generally sealed, rugged housing consisting of two portions: a base portion and a cover portion. All of the essential components of the computer, including its electronics, input means and display means, and rugged storage means, are contained within the base portion of the housing. The display means displays a mirror image of the information or data to be displayed by the computer. The base portion of the housing is attached by a hinge assembly to the cover portion, which contains a movable reflecting means on its inner surface. The movable reflecting means enables a user to view, in a readable format, the information or data initially displayed by the display means as a mirror image.

The rugged portable computer is less susceptible to damage since the display panel is protected within the shock-absorbing base portion of the housing and is not located within a slight cover which is moved every time the computer is put to use. The rugged portable computer allows for access to a portable computer by a user class, such as students, particularly younger students, who may have a tendency not to treat an item such as a portable computer in the most careful manner.

The educational system allows a student to use the rugged portable computer for a variety of uses. The system is comprised of a rugged portable computer and a storage device which is insertable and removable from the rugged portable computer. The storage device is individually programmed to allow for individual identification of the holder of such storage device. The rugged portable computer may be brought to class by a student who may take notes or perform other tasks in class using the computer The student may also transport the computer to another location, such as home, and perform homework or other school assignments on the portable computer. The rugged portable computer has internal battery power which allows functional portability and the ability to use the computer in any location independent of external electrical power. The student upon completing an assignment saves the assignment, exercise or examination (hereinafter collectively called assignment) on the storage device, which is removed from the rugged portable computer and is given to a teacher who has a means for transferring information or data contained in the storage device onto another, master computer for the purposes of grading and/or review. Upon completing the grading and/or review, the teacher enters the grade or comments onto the storage device utilizing the master computer and returns the storage device to the student who may then use the rugged portable computer to analyze the grade and/or the teacher's comments either in the classroom, at home, or other convenient locations.

FIG. 1 is an illustration of the exterior of a preferred embodiment of the rugged portable computer, hereinafter generally referred to as the computer 10. The principal components of the computer 10 are a base portion or base 12 and a cover portion or cover 14, which are connected to each other with a hinge system comprised on one or more hinge assemblies here shown as hinges 16 and 18 in a manner well-known in the art. The base portion 12 includes first and second surfaces 20 and 22, which are generally facing a user (not shown) when the computer 10 is in normal use. The first or lower surface 20 contains a standard multiple key keyboard or other input means 24 for providing information from a user to the computer electronics. The second or upper surface 22 contains a display means or display panel 26 for displaying information from the computer electronics. The information on the display panel 26 appears upside down to a user facing the computer 10 during normal use. A small opening 28 is located on the base portion 12 for receiving a storage or memory device 32, in the present embodiment, a rugged removable storage device such as a magnetic card. It will be appreciated by those skilled in the art that any other suitable type of memory device may alternatively be employed.

The cover portion 14 has inner and outer surfaces with a reflecting means or mirror 30 mounted on the inner surface. As will be appreciated by those skilled in the art, the cover portion 14 may be pivoted about the hinges 16 and 18 for moving and orienting the mirror 30 for permitting the user to view in the mirror 30 information or data displayed by the fixed-position display panel 26 in a readable form.

The primary purpose of mounting the display panel 26 in the shock-absorbing base portion 12 is to protect the display panel 26 by removing the display panel 26 from its prior art vulnerable position on the hinged cover and shock-mounting the display panel 26 in the shock-absorbing protected base 12. The primary purpose of mounting the reflecting means 30 on the inside of the cover portion 14 is to enable a user using the computer 10 to infinitely adjust the view of the display panel 26 while maintaining the display panel 26 in a fixed, unmovable, and protected portion within the base 12.

Since the base portion 12 and the cover portion 14 are attached by hinges 16 and 18, the position of the cover portion 14 may be infinitely adjusted to accommodate the needs of the user. Furthermore, since the primary goal of the present invention is to provide a rugged portable computer which is able to withstand physical stress, the computer 10 in the preferred embodiment is constructed of a durable, breakable-resistant material such as high impact plastic, and the reflecting means 30 is preferably made from a breakage-resistant, durable material such as Plexiglas or Lexan synthetic resin, polished steel or aluminum. The computer 10 also preferably has base and cover portions shaped so that when the computer 10 is closed, it forms the shape of a typical, 3-ring, loose-leaf notebook.

Figure 2:
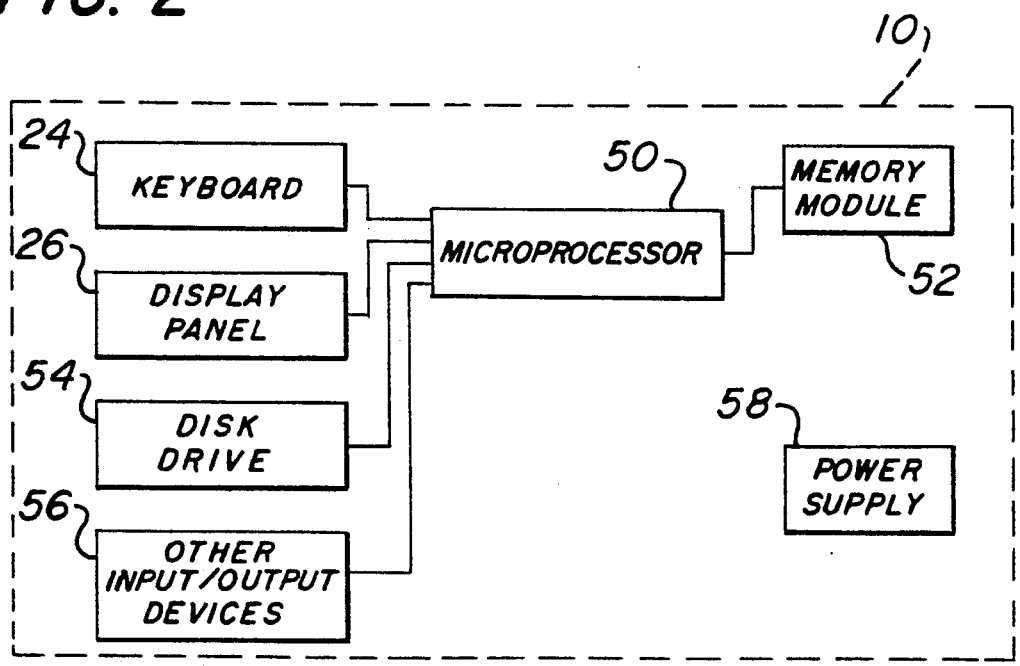
FIG. 2 is a functional block diagram of the rugged portable computer shown in FIG. 1.

FIG. 2 is a functional block diagram of the computer system of the present invention. The computer 10, which is generally typical of lap-top computers, comprises a microprocessor or central processing unit (CPU) 50 in communication with a memory module 52 for the storing and retrieving of data or information. Information can be input to the microprocessor 50 for processing either through the keyboard 24, disk drive 54, or other input/output devices 56. Other input/output devices 56 (as will be understood by one skilled in the art) might include but is not limited to, modem connections, printer connections, communication ports, etc. The disk drive 54, in the preferred embodiment, receives a rugged removable storage device 32 or other storage device in a manner well-known in the art. Information from the microprocessor 50 may be output for display to a user on the display panel 26 or may be output onto a rugged removable storage device 32 or other storage device by the disk drive 54. Computer 10 receives electrical power from a power supply 58 via a number of options, e.g., rechargeable batteries, single charge batteries, or connection to AC electrical power. The microprocessor 50 is connected to a databus, a chip select line and read and write lines which are sent to a plurality of column and row drivers, in a manner which will presently be understood, which in turn sends the information to be displayed to the display panel 26.

In the presently preferred embodiment, the display panel 26 is a liquid crystal display (LCD) panel. Generally, dot matrix LCD panels consist of an array of picture elements or pixels arranged into a plurality of rows and columns. With the presently preferred embodiment of the invention, the picture element array contains 200 rows and 640 columns resulting in a total of 128,000 pixels. Each pixel or picture element can be in one of two states, either on or off. Each character that is eventually formed and read by the user of the computer 10 is formed by turning on a specific group of pixels which cooperate with surrounding pixels which are either on or off to form the displayed character. Because there are so many pixels contained in a single display panel, the dot matrix comprising the LCD panel is scanned by control circuitry which turns each individual pixel on or off according to a video data pattern stored in the memory module 52. In the presently preferred embodiment of the invention, the control circuitry (shown in FIG. 4b) includes a plurality of column drivers 38 (only two shown for clarity) and a plurality of row drivers 40 (only two shown for clarity). By using column and row drive lines 34 and 36, respectively, the control circuitry scans the pixel array contained in the LCD panel 26 at a high rate of speed causing each pixel to be updated regularly.

Figure 3:
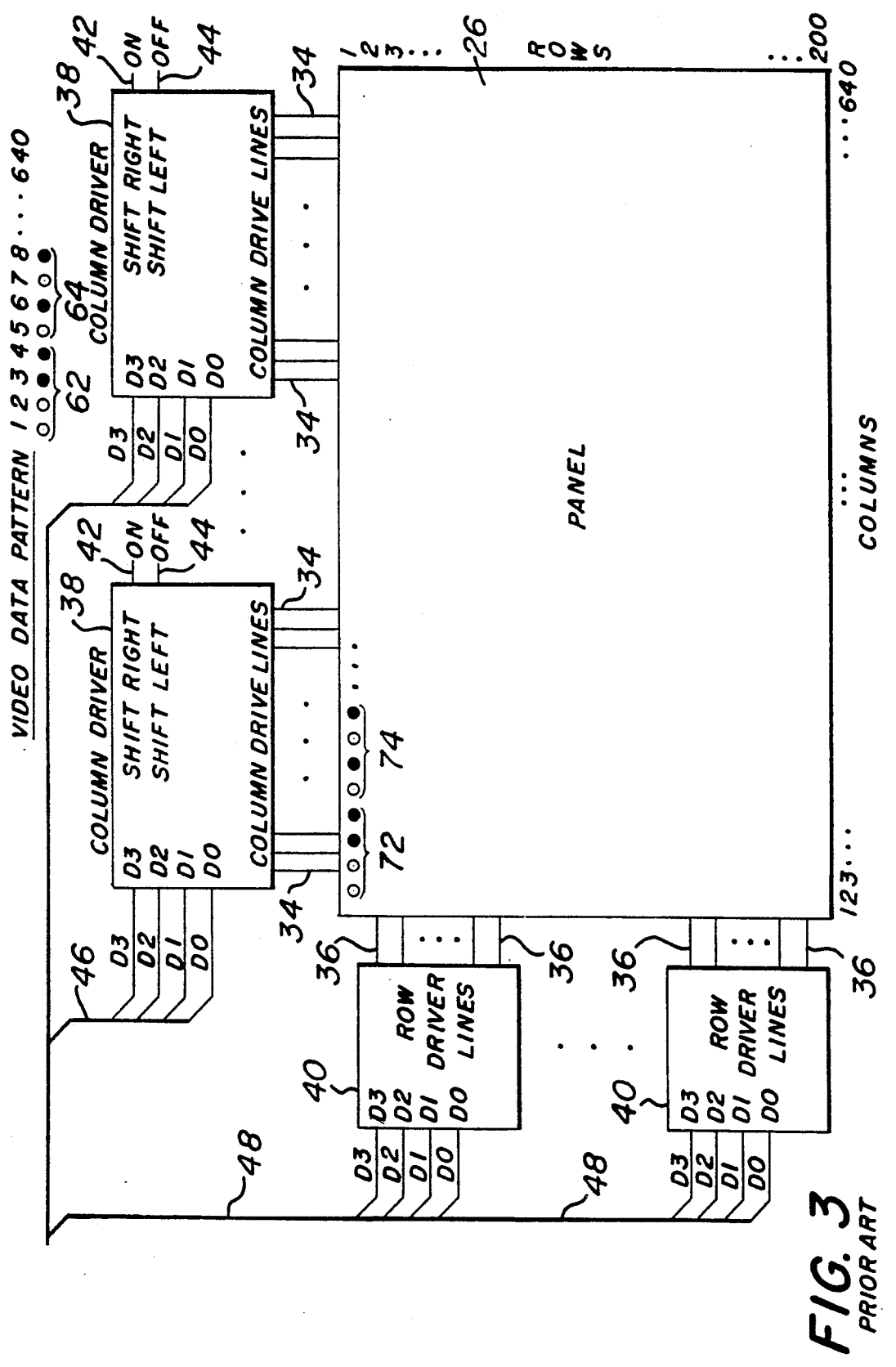
Figure 4A:
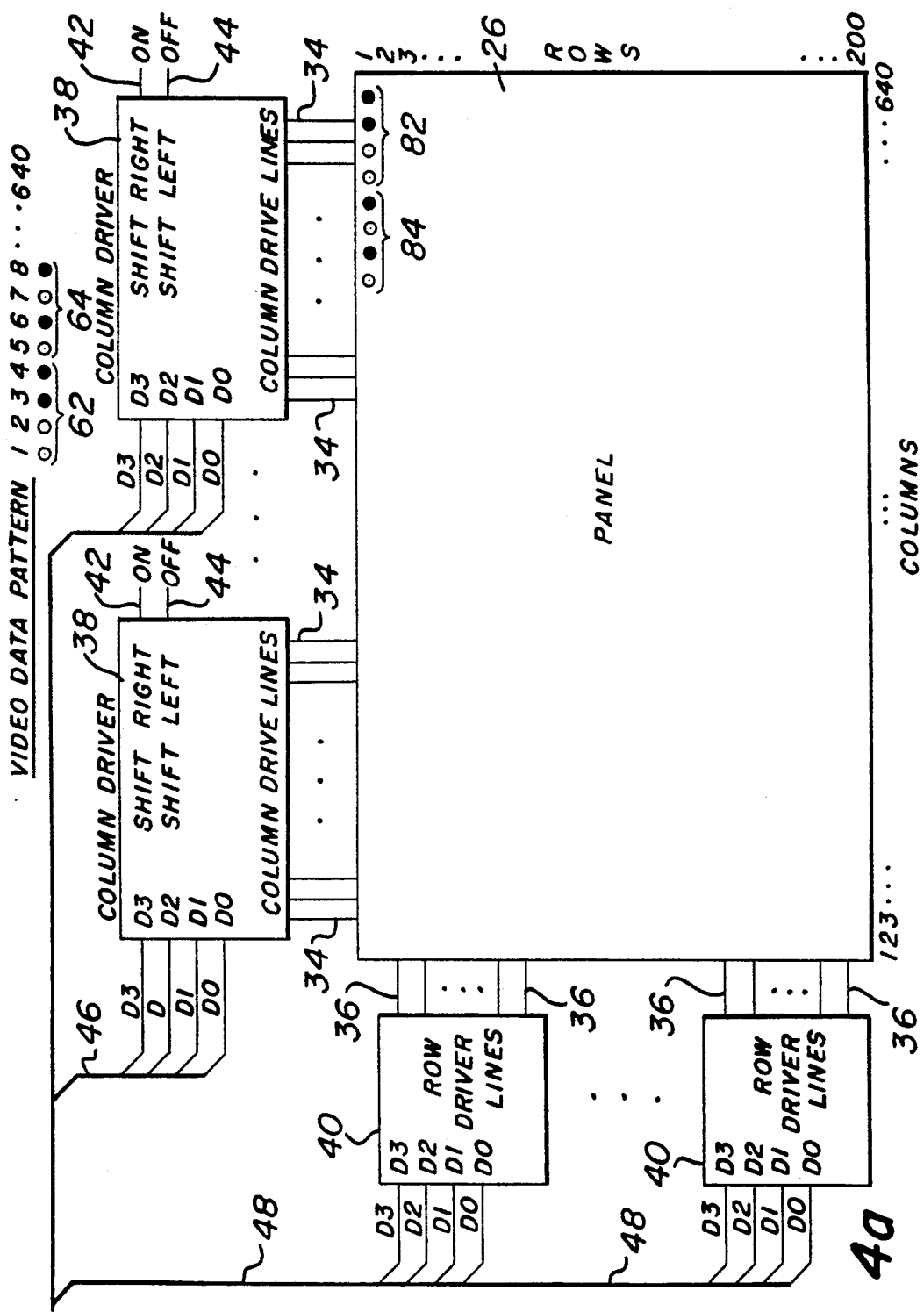
FIG. 4a is a schematic block diagram of a portion of display circuitry that represents an intermediate step between display circuitry employed in the prior art and display circuitry in accordance with the present invention.
Figure 4B:
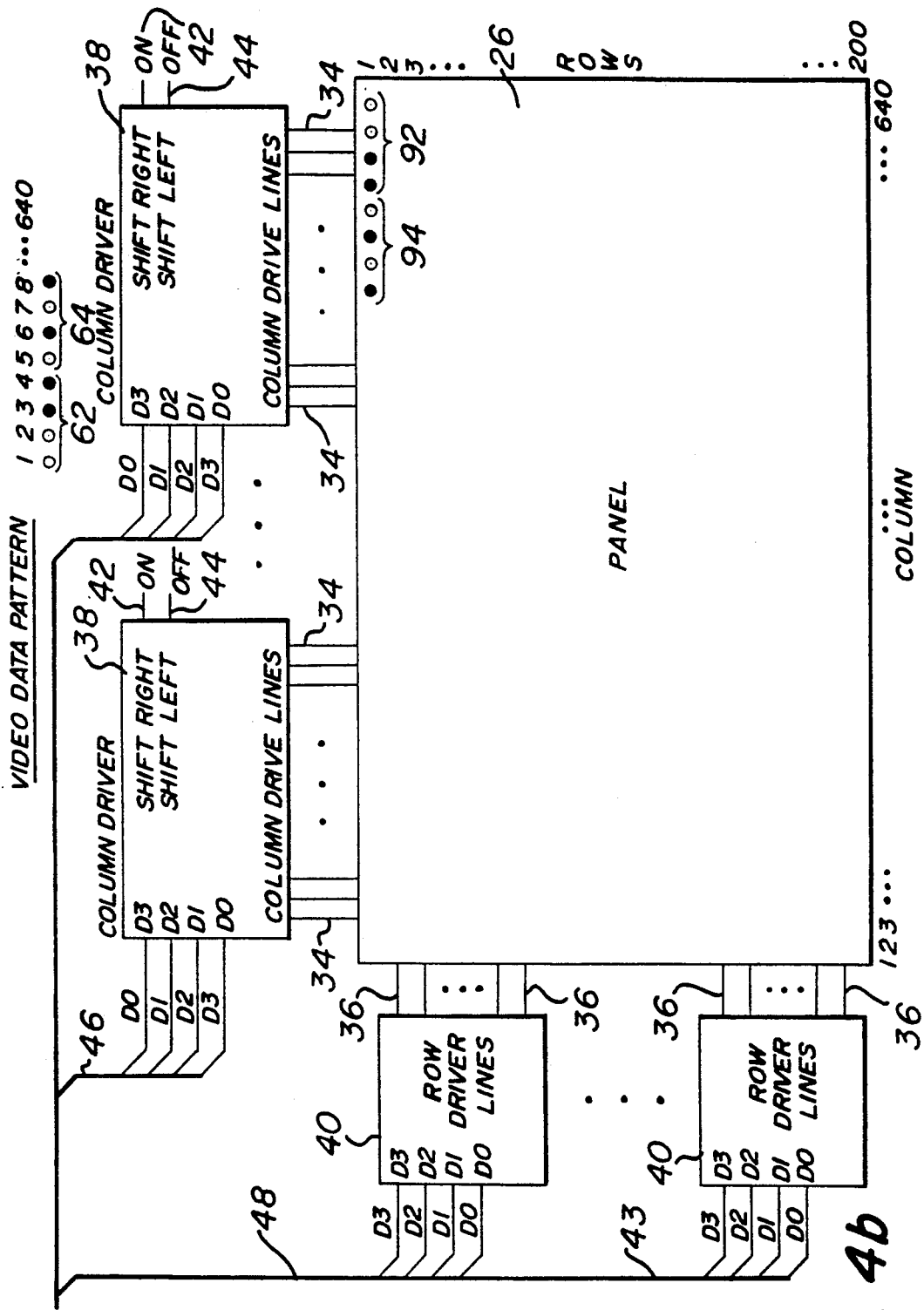
FIG. 4b is a schematic block diagram of a portion of the display circuitry, in accordance with the present invention.

Turning now to FIG. 3, there is presented a schematic block diagram of a portion of the display control circuitry of a typical prior art portable computer which provides data or information from the computer electronics to a standard display panel which is generally positioned on the inner surface of the cover and is directly viewable by a user in a conventional manner. The information or data is provided to the display panel 26 from a plurality of column and row drivers 38 and 40 along a plurality of column and row drive lines 34 and 36. The column drive lines 34 are each connected to a column driver 38. Similarly, the row drive lines 36 are each connected to a row driver 40. The column and row array of display panel 26 is scanned by the control circuitry in a standard reading pattern, i.e., one row at a time beginning at the top of display panel 26, with each column contained within the row being updated in sequence, from left to right. The column drivers 38 each include shift switches 42 and 44 which are set with the shift right switch 42 in the on state and the shift left switch 44 in the off state. Set in this way, column driver 38 shift switches 42 and 44 cause the column drivers to scan the display panel 26 columns from left to right. The information or data is presented to the column and row drivers from the memory module 52 shown in FIG. 2, according to a video pattern stored in the memory module 52. For illustration purposes, two four-bit video patterns 62 and 64 are shown in FIGS. 3, 4a, and 4b. The video data patterns are usually generated by software contained within the microprocessor 50 of the computer 10 which sends multiplexed information to the column and row drivers 38 and 40. The setting of switches and the routing of data lines of the control circuitry determines how video data patterns are conveyed to particular row and column positions on the display panel 26.

Video patterns 62 and 64, included in FIGS. 3, 4a and 4b, are used in conjunction with display 26 data patterns (72 and 74 in FIG. 3, 82 and 84 in FIG. 4a, 92 and 94 in FIG. 4b) to illustrate how modifications to the control circuitry effect the positioning of video patterns on the display panel 26 and to aid in the understanding of how the control circuitry of the prior art differs from the presently preferred embodiment of the invention.

Information or data from the memory module 52 is typically presented four bits at a time to column and row drivers 38 and 40 along a series of data lines 46 and 48 where each data line conveys a data bit to a data bit position at the column driver 38. Because information or data from memory module 52 is presented four bits at a time to column drivers 38, the scanning of a single 640 column row or memory array requires 160 four-bit presentations. The left-to-right scanning pattern is a result of the setting of column driver 38 shift switches 42 and 44, and also the left-to-right orientation of the four bits that comprise each four-bit presentation. For each of the 160 four-bit data patterns required to scan a complete 640 bit row or memory array, data bit D0 is conveyed to data bit position D0, data bit D1 is conveyed to data bit position D1, data bit D2 is conveyed to data bit position D2, and data bit D3 is conveyed to data bit position D3. In FIG. 3, with column driver 38 shift switches 42 and 44 set as shown and data lines 46 routed as shown, the control circuitry conveys video data pattern 62 and 64 to display panel 26 data patterns 72 and 74, respectively. The mechanism for conveying the video data pattern to the display panel 26 column drivers is substantially the same mechanism for the row drivers.

In the present embodiment of the invention, viewing the contents of the display panel 26 on the movable reflective means 30 in a proper readable orientation, requires that the information or data on the display panel 26 appear upside down and backwards. To make the data on display panel 26 appear in a reverse or backwards orientation, the control circuitry must scan display panel 26 pixel columns in a right-to left order. Two modifications to the control circuitry of the prior art are required to effect this reversal of pixel scanning pattern. FIG. 4a shows the first modification to the control circuitry. FIG. 4b shows both the first and the second modification that together represent the presently preferred embodiment of the invention.

In FIG. 4a, there is shown a schematic block diagram of a portion of the display circuitry of the present invention. The display circuitry includes a display panel 26 to which the information or data is provided. The information is provided to the display panel 26 along column drive lines 46 and row drive lines 48 as with the prior art. The column drive lines 34 are each connected to a column driver 38. Similarly, the row drive lines 36 are each connected to a row driver 40. The information or data is provided to the column and row drivers 38 and 40 from the memory module 52 shown in FIG. 2. according to a video data pattern stored in the memory array 52. The position of switches 42 and 44 of column drivers 38, is modified from the prior art such that switch 44 (shift left switch) is in an on state while switch 42 (shift right switch) is in an off state. This causes the order of the 160 individual four-bit data patterns that make up a single 640 bit row of the display panel 26 to be reversed. That is, the first four-bit pattern of video data is sent to the last four columns of the row rather than the first four columns, the second four-bit pattern of video data is sent to the second-to-last four columns of the row rather than the second four columns of the row, etc. FIG. 4a illustrates this by showing that video patterns 62 and 64 are conveyed to display panel positions 82 and 84, respectively. This setting of the column driver 38 shift switches 42 and 44 causes a reversal of the order of the 160 four-bit data patterns that comprise a memory array row. This is, however, an incomplete reversal of the 640 bits of the display panel row because the individual data bits within each four-bit pattern are still in left-to-right order. This is shown in FIG. 4a and is verified by comparing the four-bit video patterns 62 and 64 against display panel patterns 82 and 84, respectively.

FIG. 4b shows the preferred embodiment of the present invention control circuitry that causes a complete reversal of all 640 bits of a display panel row. A complete reversal occurs when shift switches 42 and 44 are set as discussed above with respect to FIG. 4a and data lines 46 are modified so that the order of the information or data presented to the column drivers 38 is reversed. In the present embodiment, the column drivers 38 receive information or data along the data lines 46. As is evident from a comparison between FIGS. 4a and 4b, the data lines 46 of FIG. 4b are in a reversed orientation, i.e., data bit D0 is conveyed to data bit position D3, data bit D1 is conveyed to data bit position D2, data bit D2 is conveyed to data bit position D1, and data bit D3 is conveyed to data bit position D0 of the column drivers 38. This modification to the prior art control circuitry, in conjunction with the modified shift switch settings detailed above, results in the complete reversal of data that is formed on the display panel 26. Comparing video data patterns 62 and 64 against display panel patterns 92 and 94, respectively, verifies the complete reversal of memory array data as it is displayed on display panel 26. Ergo, characters being formed on the display panel 26 will be formed in a backwards orientation.

In the present invention, the columns contained within the display panel 26 are scanned from right-to-left thereby causing the pixels to be turned on or off in a four-bit reversed sequence. Additionally, the information or data stored in a memory array within the memory module 52 is sent to the plurality of column drivers 38 four bits at a time through the data lines 46 in reverse order. Consequently, the data or information intended for the pixel in row 1, column 1 in the prior art is routed to the pixel at row 1, column 640 in an LCD panel that consists of 200 rows and 640 columns. In order to generate a mirror image of the information or data contained within the memory array, only circuitry for the column drivers 38 needs to be changed. The row driver circuitry need not be modified since the scanning of the rows is not affected.

Finally, the display panel 26 is flipped or rotated 180 degrees so that the row which used to be at the bottom is now at the top and vice versa. This causes the data to appear on display panel 26 in an upside-down orientation. The cumulative effect of the above modifications to the control circuitry that cause data to be reversed as shown in FIG. 4b, and the rotation of the display panel 26 by 180 degrees, is that the data appearing on display panel 26 appears upside down and backwards (see FIG. 1). Consequently, in the present invention, data will appear on reflective means 30 in the proper readable orientation.

The present invention also comprises a system employing the rugged portable computer 10 for student use. In the preferred embodiment of the invention, the student brings the rugged portable computer 10 to class and performs any number of tasks usually performed by a student in class, such as taking notes, preparing papers, doing math problems, etc. If desired, the student can remove the computer 10 from the classroom and may transport the computer 10 to another location, i.e. home, so that any assignments received in the classroom may be performed on the computer 10 at the other location. Internal battery power allows functional portability and the ability to use the computer in any location independent of the availability of external electrical power. The computer includes an opening 28 into which a storage or memory device 32 shown in FIG. 1 may be inserted and removed. The student is able to save any assignments performed on the rugged removable storage device 32. The storage device 32 can then be handed to a teacher who has means for transferring assignments from the storage device onto a second or master computer (not shown) for the purposes of grading and/or review. Additionally, upon the completion of grading or review by teacher, the teacher is able to transfer the results of such grading and/or review back onto the storage device 32 which is returned to the student who may reinstall the rugged removable storage device 32 into the portable computer 10 and review the comments from the teacher on the rugged portable computer 10.

From the foregoing description, it can be seen that the present invention comprises a rugged portable computer and educational system employing the computer. It will be appreciated by those skilled in the art that changes and modifications may be made to the above described embodiment without departing from the invention or concepts thereof. It is understood, therefore, that the present invention is not limited to the particular embodiment described, but is intended to include all modifications and changes which are within the scope and spirit of the invention as defined by the appended claims.

I claim:

1. A rugged hand-carriable portable computer comprising:

a housing including a base with first and second surfaces and a cover having inner and outer surfaces;

a display for displaying information from the computer, the display being located on the first surface;

input means for providing information from a user to the computer, the input means at least partially located on the second surface;

a movable reflecting means for permitting a user to view an upside-down mirror image of the display said movable reflecting means disposed on said inner surface; and means for enabling the display to display an upside-down mirror image of the information to be viewed, where the movable reflecting means reflects the mirror image of the information displayed by the display in mirror image so that the user perceives the information in a recognizable form.

2. The computer as recited in claim 1, wherein the housing has the shape of a loose-leaf notebook.

3. The computer as recited in claim 1, wherein said display comprises a dot matrix display panel.

4. The computer as recited in claim 3, wherein said means for enabling the display to display a mirror image includes a dot matrix display driver which has both column and row drivers.

5. The computer as recited in claim 4, wherein said dot matrix display comprises an array of picture elements arranged as rows and columns, said picture elements being in either an on state or an off state.

6. The computer as recited in claim 5, wherein said dot matrix display image is determined by a video data pattern stored in a memory module which includes means for storing the state of the picture elements.

7. The computer as recited in claim 6, wherein said dot matrix display driver scans the columns from right to left.

8. The computer as recited in claim 6, wherein picture elements stored in the memory module are presented four at a time in reverse order to the column drivers.

9. The computer as recited in claim 6, wherein said dot matrix display image in said display panel is oriented upside down when viewed directly by the user.

10. The computer as recited in claim 1, wherein said housing includes an opening on the base for receiving a storage device.

11. The computer as recited in claim 1, wherein said input means comprises a keyboard.

12. The computer as recited in claim 5, wherein said input means further comprises a storage device.

13. The computer as recited in claim 1, wherein said reflecting means comprises a mirror.

14. The computer as recited in claim 1, wherein the base and cover are attached by at least one hinge assembly so that the cover can be moved with respect to the base to allow the cover to be placed into a closed position or to be oriented at an inclination with respect to the base and wherein the reflecting means is secured to the inner surface of the cover.

15. The computer as recited in claim 1, wherein the housing is made out of a durable, breakage-resistant material.

16. The computer as recited in claim 1, wherein said reflective means is made out of an breakage-resistant durable material.

17. The computre as recited in claim 1, wherein the base and cover are generally rectangular in shape and are generally the size of a standard, 3-ring, loose-leaf notebook and wherein said reflective means is generally the same shape as the base and cover but smaller in size.

* * * * *